US009260043B2

(12) United States Patent
Robert et al.

(10) Patent No.: US 9,260,043 B2
(45) Date of Patent: Feb. 16, 2016

(54) MOUNTING SYSTEM FOR A HEADREST RETRACTABLE BY GRAVITY, ASSEMBLY COMPRISING SUCH A MOUNTING SYSTEM AND VEHICLE SEAT COMPRISING SUCH AN ASSEMBLY

(71) Applicant: FAURECIA Sièges d'Automobile, Nanterre (FR)

(72) Inventors: Jacques Robert, Marcoussis (FR); Philippe Pedronno, Morsang sur Seine (FR); Patrick Plaut, Massy (FR)

(73) Assignee: Faurecia Sieges d'Automobile, Nanterre (FR)

( * ) Notice: Subject to any disclaimer, the term of this patent is extended or adjusted under 35 U.S.C. 154(b) by 0 days.

(21) Appl. No.: 13/937,497

(22) Filed: Jul. 9, 2013

(65) Prior Publication Data

US 2014/0191555 A1    Jul. 10, 2014

(51) Int. Cl.
*A47C 7/36* (2006.01)
*B60N 2/48* (2006.01)
*B60N 2/46* (2006.01)

(52) U.S. Cl.
CPC .............. *B60N 2/4811* (2013.01); *B60N 2/464* (2013.01); *B60N 2/482* (2013.01); *B60N 2/4814* (2013.01); *B60N 2/4829* (2013.01); *B60N 2/4864* (2013.01); *B60N 2/4817* (2013.01); *Y10T 403/602* (2015.01); *Y10T 403/7062* (2015.01)

(58) Field of Classification Search
CPC .. B60N 2/4864; B60N 2/4817; B60N 2/4829; B60N 2/464; A47C 1/036; A47C 7/38

USPC ............... 297/410, 391, 409, 411.37, 411.36
See application file for complete search history.

(56) References Cited

U.S. PATENT DOCUMENTS

| 5,236,246 | A  | * | 8/1993  | Harrell ........................... 297/408 |
| 5,265,938 | A  | * | 11/1993 | Melhuish et al. ........ 297/411.36 |
| 5,586,809 | A  | * | 12/1996 | Szmadzinski ................. 297/353 |
| 6,974,190 | B1 | * | 12/2005 | Hung ....................... 297/411.36 |
| 7,407,231 | B2 | * | 8/2008  | Kraft et al. .................... 297/410 |
| 2004/0070244 | A1 | * | 4/2004 | Williams et al. ........... 297/250.1 |
| 2004/0090094 | A1 | * | 5/2004 | Williams et al. ......... 297/188.11 |
| 2004/0124678 | A1 | * | 7/2004 | Williams et al. ......... 297/256.11 |

(Continued)

FOREIGN PATENT DOCUMENTS

| DE | 19737706 C1 | 1/1999 |
| DE | 10153058 A1 | 5/2003 |
| EP | 1602527 A2  | 12/2005 |

OTHER PUBLICATIONS

Preliminary Search Report for related French Application No. FR 13 50082; report dated Sep. 18, 2013.

*Primary Examiner* — David E Allred
(74) *Attorney, Agent, or Firm* — Miller, Matthias & Hull LLP

(57) ABSTRACT

A mounting system for a headrest comprising at least one shaft, the system comprising a housing adapted to enclose the shaft with a radial clearance, a moving carriage capable of being moved between a blocking position and an unblocking position, and a jaw movable between an immobilization position and a release position. The jaw is adapted to apply, when it is in the immobilization position, a clamping force to the shaft in a clamping direction perpendicular to the vertical direction, so that the shaft is supported on the housing. The moving carriage comprises at least one drive slot in which a slug from the jaw is able to move.

6 Claims, 7 Drawing Sheets

(56) References Cited

U.S. PATENT DOCUMENTS

2006/0087167 A1* 4/2006 Kraft et al. .................... 297/410
2006/0250017 A1* 11/2006 Otto et al. ..................... 297/410
2010/0207421 A1* 8/2010 Sayama .......................... 296/66
2014/0292052 A1* 10/2014 Parker et al. .................. 297/342

* cited by examiner

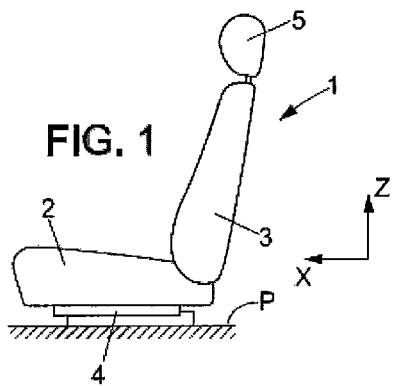
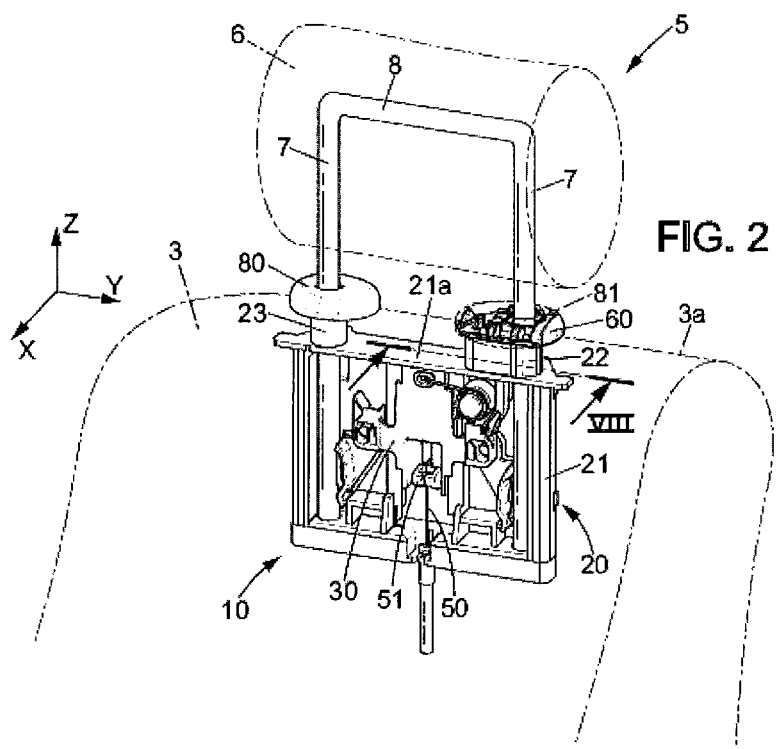

MOUNTING SYSTEM FOR A HEADREST RETRACTABLE BY GRAVITY, ASSEMBLY COMPRISING SUCH A MOUNTING SYSTEM AND VEHICLE SEAT COMPRISING SUCH AN ASSEMBLY

CROSS-REFERENCE TO RELATED APPLICATIONS

This application claims priority under 35 USC §119 and the Paris Convention to French Patent Application No. FR 13 50082, filed on Jan. 4, 2013.

FIELD OF THE DISCLOSURE

The present invention relates to the mounting systems for a headrest retractable by gravity on a seat, to the assemblies comprising such a mounting system as well as a headrest and to the vehicle seats comprising such an assembly.

BACKGROUND OF THE DISCLOSURE

More specifically, the invention relates to a mounting system for at least one shaft, the shaft extending in a vertical direction, the mounting system comprising
  a housing adapted to enclose the shaft with a radial clearance and
  a moving carriage that can be moved between a blocking position and an unblocking position,
  at least a jaw movable between an immobilization position and a release position,
  the jaw being driven by the moving carriage to be in the immobilization position when the moving carriage is in the unblocking position and in the release position when the moving carriage is in the blocking position, the jaw being adapted to apply, when it is in the immobilization position, a clamping force to the shaft in a clamping direction perpendicular to the vertical direction, so that the shaft is supported on the housing.

Document EP 1 602 527 describes an example of a mounting system for a headrest on a seat that includes the features mentioned above and allows the retraction of the headrest simply under gravity. In order to allow the descent of the headrest under gravity, it is necessary for the shafts to be free in their move and for the housing to thus enclose them with a radial clearance. This radial clearance lets the shafts free to vibrate inside the housing, which causes rattle and vibration sounds unpleasant to the user when the motor vehicle is moving. In order to limit these disadvantages, the mounting system detailed in document EP1 602 527 presents a clamping device for the shafts adapted to exert a force that places them in support against the housing walls.

In order to allow the user to easily adjust the height of the headrest, the force exerted by the clamping device on the shafts is limited so as to allow the shafts to slide in the vertical direction when the user exerts a force on the headrest.

SUMMARY OF THE DISCLOSURE

The present invention particularly aims to reduce the manufacturing cost of such a mounting system by diminishing the number of elements of which it is built.

For this purpose, according to the invention, a mounting system of this type is characterized in that the moving carriage includes at least a drive slot in which a slug from the jaw is able to move.

In preferred embodiments of the invention, it is possible to further resort to one and/or the other of the following arrangements:
  the moving carriage moves in the vertical direction between the blocking position and the unblocking position, and one portion at least of the drive slot is substantially inclined with respect to the vertical direction;
  the jaw includes a flexible clamping member adapted to be in contact with the shaft and to apply the clamping force on said shaft, when the jaw is in the immobilization position;
  the jaw includes at least one opening behind the flexible clamping member in order to allow the clamping member to flex by a predetermined value when it applies the clamping force;
  the system further includes a return spring adapted to apply a force on the moving carriage in order to bring the carriage back in the unblocking position;
  the jaw and the housing form a single piece, the jaw pivotally moving between the immobilization position and the release position using a flexible hinge;
  the system further includes a lock that can be controlled by the moving carriage between a locking position and an unlocking position, said lock immobilizing the shaft in the vertical direction when it is in the locking position.

Another object of the invention is to provide an assembly including a headrest comprising at least one shaft extending in the vertical direction, as well as a mounting system of said shaft as described above.

In a preferred embodiment of the invention, the shaft may have at least one notch adapted to engage with the lock when it is in the locking position.

Finally, another object of the invention is to provide a vehicle seat including a base, a backrest mounted on the base and an assembly as described above mounted on the backrest.

BRIEF DESCRIPTION OF THE DRAWINGS

Other features and advantages of the invention will become apparent from the description below of one of its embodiments, given as a non-limiting example, with reference being made to the attached drawings.

In the drawings:

FIG. 1 is a schematic representation in lateral view of a vehicle seat,

FIG. 2 is a schematic representation in perspective of an upper part of the vehicle seat of FIG. 1, illustrating a headrest mounted on a seat backrest through a mounting system.

DETAILED DESCRIPTION OF THE DISCLOSURE

Figure 3:
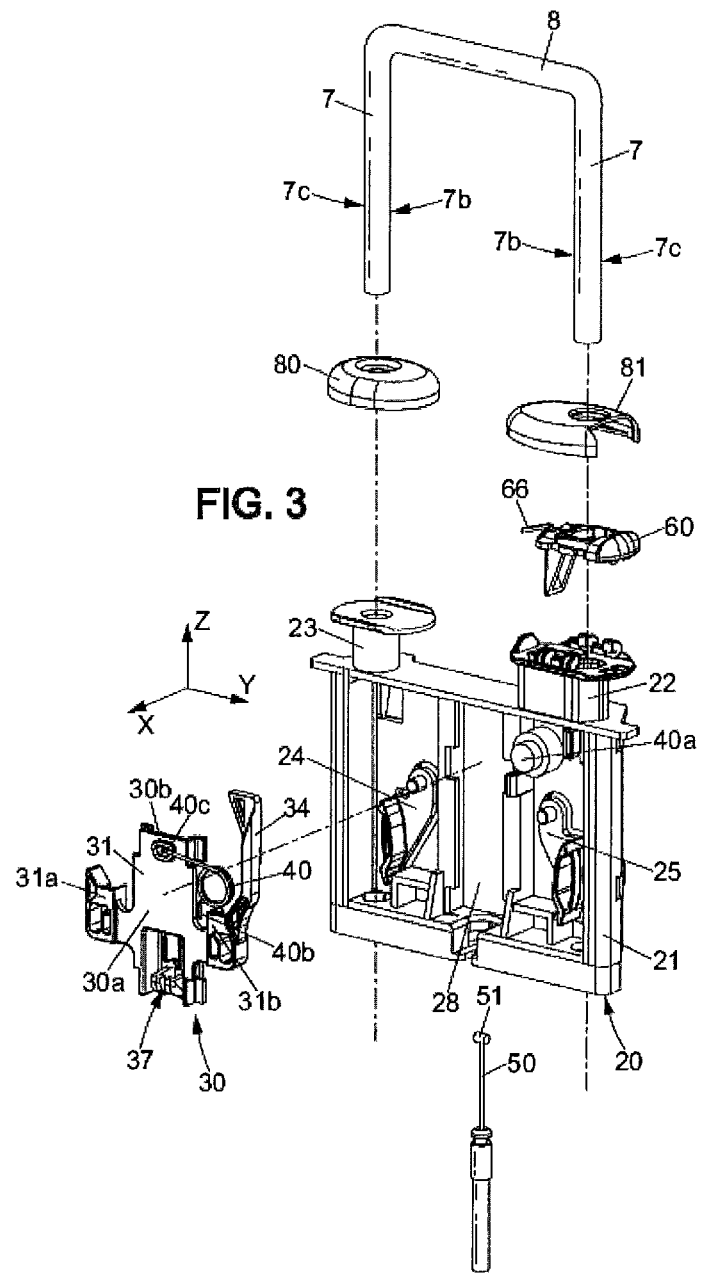
FIG. 3 is a representation in fragmented perspective of the mounting system in FIG. 2.

By first referencing to FIG. 1, a vehicle seat 1 mounted on a floor P extending in a horizontal plane XY is illustrated in FIG. 1.

The seat 1 comprises a base 2 that extends in a longitudinal direction X of the horizontal plane XY and a backrest 3 that extends in a vertical direction Z perpendicular to the horizontal plane XY. A transversal direction Y of the horizontal plane XY is also defined here, perpendicular to the longitudinal direction X.

The seat 1 is, for example, a vehicle seat for which the base 2 is mounted on the floor P using guideways 4 adapted to slide in the longitudinal direction X in order to be capable of adjusting the longitudinal position of the base 2 with respect to the floor P. The backrest 3 comprises a reinforcement enclosed in a lagging and may be mounted on the base 2 by means of an articulation around a transversal axis in order to be capable of adjusting the inclination of the backrest 3 with respect to the base 2.

In FIGS. 1 and 2, the seat 1 also includes a headrest 5 mounted on an upper part of the backrest 3, opposite to the base 2, through a mounting system 10 located in the backrest 3 thickness.

The headrest 5 comprises a lagging 6 and a metallic insert 8 supporting the lagging 6. In the represented embodiment, the metallic insert 8 substantially presents an inversed U-shape comprising a horizontal part and two vertical shafts 7 connected by the horizontal part. As represented in transparence of the lagging 6 in FIG. 2, the horizontal part and a part of the shafts 7 are arranged in the lagging 6, the shafts 7 extending to respective free ends placed outside of the lagging 6.

Throughout the description, the terms "front" and "back" and their synonyms are understood as relating to the front and the back of the seat in the longitudinal direction X when the seat is used normally. The terms "top", "bottom", "upper" and "lower" and their synonyms relate to the vertical axis Z again when the seat is used normally. Finally, the headrest and the seat globally present symmetry with respect to a vertical plane of symmetry XZ located at the middle of the transversal extension of said seat and headrest. The terms "inner" and "outer" should be understood as relating to the distance to this plane of symmetry in the transversal axis Y. Therefore, the "inner side of an object" should be understood as being the side of this object that is the nearest to the plane of symmetry in the transversal direction Y and "the outer side of an object" should be understood as being the side of this object that is the furthest from the plane of symmetry in the transversal direction Y.

Figure 4:
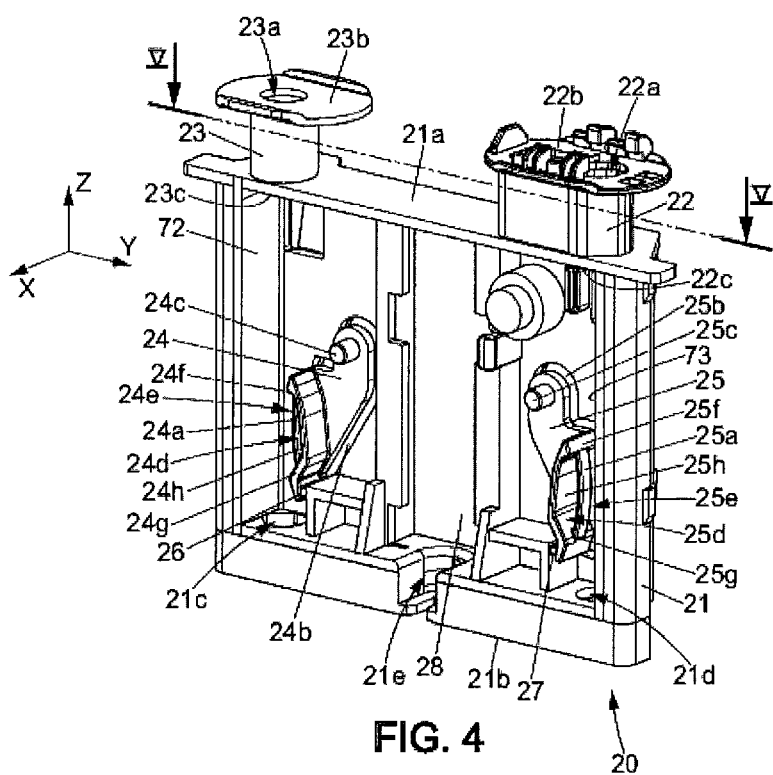
FIG. 4 is a representation in perspective of the housing of the mounting system of FIG. 2, FIGS. 5a and 5b are partial cross-sectional representations in the referenced V-V orientation in FIG. 4 when the clamping device is in release position and in immobilization position respectively.

The mounting system 10 represented in FIG. 3 includes a housing 20, detailed in FIG. 4, consisting of a body 21 with a rectangular general shape and located in the thickness of the backrest 3, as well as two sleeves 22, 23, that extend inside the lagging of the backrest 3 and in the vertical direction Z from the upper surface 21a of the body 21 to the upper end 3a of the backrest 3.

The sleeves 22, 23 are tube-shaped and both possess an inner surface delimiting a pocket 22a 23a open to the outside at their upper ends 22b, 23b and open towards the interior of the body 21 at their lower end 22c, 23c. The pockets 22a, 23a are dimensionally adapted to accommodate the vertical shafts 7 of the headrest 5 with a radial clearance 29, said shafts being inserted in the housing 20 by the upper ends of the sleeves 22b, 23b and by following the vertical direction Z.

In an advantageous way, the body 21 presents on its lower face 21b two openings 21c, 21d placed with respect to the lower ends 22c, 23c of the sleeves 22, 23, so as to allow the shafts 7 to cross through and in the vertical direction Z the housing 20.

Figure 5A:
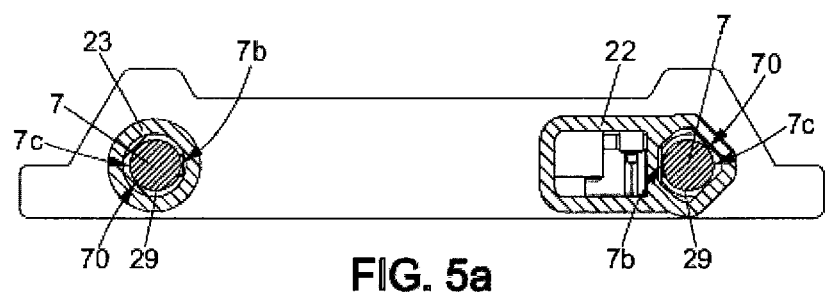

As indicated in FIG. 5a, once the shafts 7 are inserted in the housing 20, there is a radial clearance 29 between the shafts and the housing. This radial clearance 29 allows the shafts to slide without stress in the housing.

With reference being made to FIG. 4, the mounting system 10 further comprises two jaws 24, 25 including clamping members 24a, 25a which are placed in contact with the surfaces to be clamped 7b of the shafts 7.

The jaws 24, 25 may for example be formed in the same part as the housing 20 by doing two cuts 24b, 25b almost closed to themselves. The cuts 24b, 25b let the jaws 24, 25 connected to the body 21 only by means of flexible hinges 26, 27, for example consisting of a band of small thickness from the housing material 20.

Figure 5B:
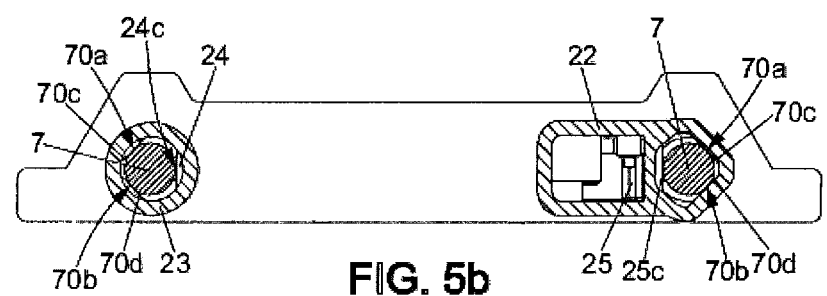
Figure 7A:
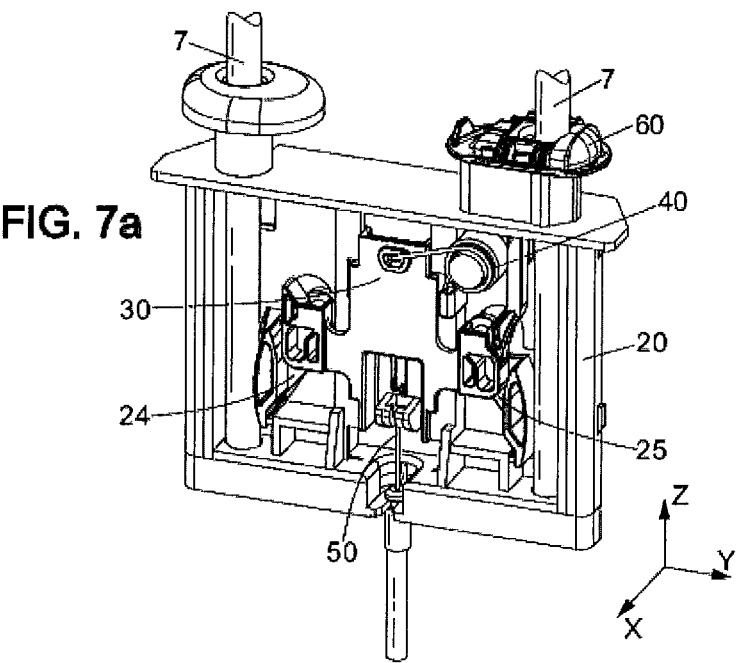
Figure 7B:
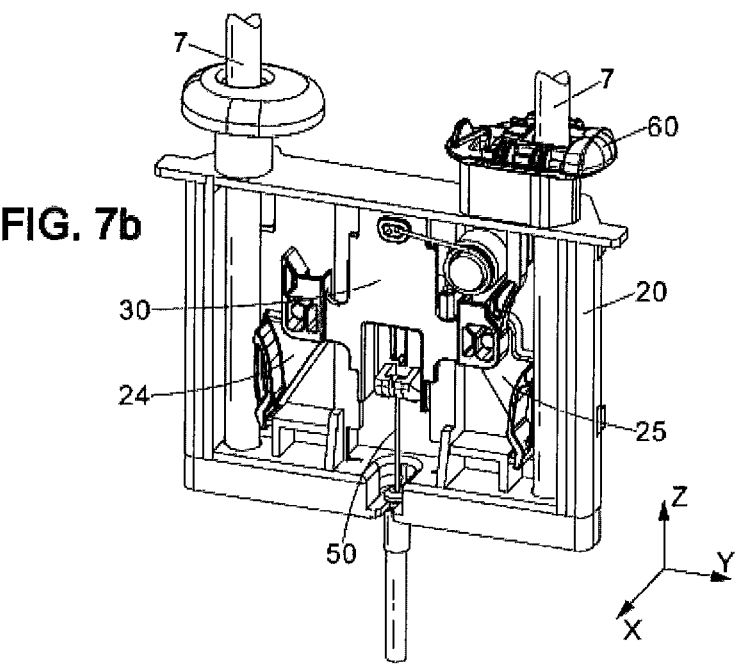

The jaws 24, 25 may thus rotate in the plane XY using flexible hinges 26, 27 to move from an immobilization position, visible in FIGS. 5b and 7b, where they are in contact with the shafts 7 to a release position, visible in FIGS. 5 a and 7a, where they are not in contact with the surfaces to be clamped 7b of the shafts 7.

As an alternative, the jaws 24, 25 may be in a different part of the body 21 and connected to said body 21 by means of pivot hinges.

In the immobilization position, visible in FIGS. 5b and 7b, the jaws 24, are both in contact with the surfaces to be clamped 7b of the shafts 7 at a clamping member 24a, 25a of said jaws 24, 25.

The clamping members exert, on the surfaces to be clamped 7b of the shafts 7, a force directed in the transversal direction Y and outwardly oriented. The shafts 7 are thus both repelled towards the walls of the housing 20, so that their support surfaces 7c are in contact with the inner surfaces 70 of the sidewalls 72, 73 of the housing 20 as indicated in FIG. 5b.

In an advantageous way, when the jaws are in immobilization position, the inner surfaces 70 each have at least 2 contact points 70a, 70b, punctual or linear, with the support surfaces 7c of the shafts 7 indicated in FIG. 5b. The projections on a horizontal plane XY of point 70a, 70b as well as the contact point of the surfaces to be clamped 7b of the shafts 7 with the clamping members 24a, 25a are not confounded. Hence, when the jaws 24, 25 are in immobilization position, the shafts 7 are both maintained by three different contact points in the horizontal plane XY which ensures their immobilization in the horizontal plane XY.

To that end, the inner surfaces 70 may for example comprise two inclined surfaces 70c, 70d relative to one another so as to form a "V" in the horizontal plane XY. Alternatively, they may comprise rivets or ribs projecting towards the interior of the housing and in the direction of the support surface 7c of the shaft 7, to engage with it when the jaws 24, 25 exert a clamping force on the shafts 7.

In an embodiment of the invention, to control the force exerted by the jaws 24, 25 on the shafts 7, the clamping members 24a, 25a are flexible.

Flexible means that the clamping members 24a, 25a may flex or deform in the transversal axis Y to absorb and control part of the force applied on the shafts.

The force applied by a clamping member 24a, 25a on the shaft 7 may for example range from 10N to 400N.

The force applied may advantageously be close to 100N.

Flexion means a deformation of the shape of a clamping member 24a, 25a when a jaw 24, 25 is in the immobilization position, compared to the shape of this clamping member 24a, 25a when said jaw is in the release position.

The clamping members 24a, 25a may flex by a predetermined value ranging for example from 0.5 mm to 5 mm.

Advantageously, the clamping members may flex by a predetermined value substantially close to 1 mm.

The predetermined value of the flexion is for example measured as being a driving-in length in the transversal axis Y of the part of the clamping member which is in contact with the shaft 7.

The driving-in length is measured by comparing the shape of the clamping member 24a, 25a, with the jaw, in the immobilization position, to the shape of the clamping member 24a, 25a, with the jaw in the release position, for example, by measuring the movement of the part of the clamping member 24a, 25a which is in contact with the shaft 7 with respect to the rest of the clamping member 24a, 25a.

The clamping members 24a, 25a may consist of flexible surfaces of the jaws 24, 25.

In an embodiment of the invention, the jaws 24, 25 may for example be made of plastic, for example POM (polyoxymethylene).

In this embodiment, the jaws 24, 25 and the body 21 may for example be made of a single piece as it has been described above.

In another embodiment, the jaws 24, 25 and the body may be made of two different materials, the body 21 being for example out of plastic, for example a polymer like ABS or PC/ABS and the hinges out of ABS or POM.

The clamping members may also consist of bars or flexible tongues mounted on the jaws 24, 25, for example metal flexible tongues fixed on the jaws 24, 25.

In this embodiment, the bars or flexible tongues may be made of plastic but also metal, for example metal flexible tongues.

In this way, the holding in time of the clamping members is improved.

When the clamping members 24a, 25a consist of flexible surfaces of the jaws 24, 25, they might for example both be enclosed in two vertical openings 24d, 24e, 25d, 25e, performed in the jaw 24, 25 at the front 24d, 25d and at the back 24e, 25e of the clamping member 24a, 25a. In this way, the clamping member 24a, 25a is connected to the jaw only by its upper 24f, 25f and lower ends 24g, 25g and can deform in the transversal axis Y to absorb part of the force applied by the jaws.

Furthermore, openings 24h, 25h may be performed in the jaws, behind the clamping members 24a, 25a, so as to allow the clamping member 24a, 25a to flex by a predetermined value when it applies the clamping force.

The openings 24h, 25h might be also make it possible to reduce the thickness of the material forming said clamping members 24a, 25a, when the latter consist of flexible surfaces of the jaws 24, 25, and hence to increase their flexibility.

The clamping members 24a, 25a then constitute elastic elements of force transfer.

Figure 6:
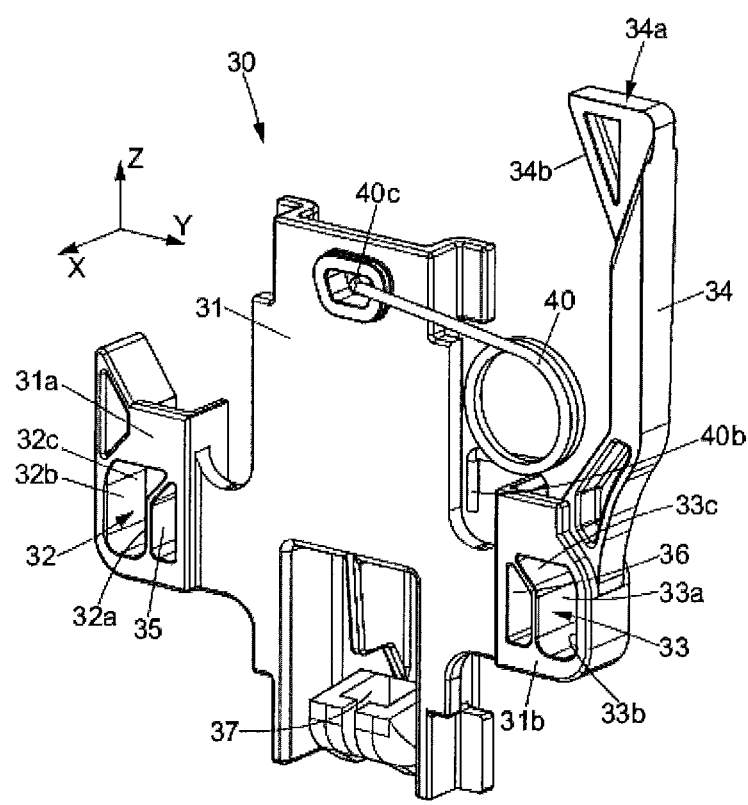
FIG. 6 is a representation in perspective of the moving carriage of the mounting system of FIG. 2, FIGS. 7a and 7b are representations in perspective of the mounting system of FIG. 2 when the clamping device is in release position and in immobilization position respectively.

With reference being made to FIGS. 4 and 6, the mounting system 10 further includes a moving carriage 30 engaging in an opening 28 of the body 21. The opening 28 extends in the vertical Z direction so as to allow the moving carriage 30 to move in said vertical direction Z from a blocking position visible in FIG. 7a to an unblocking position visible in FIG. 7b.

The moving carriage 30 includes a front surface 30a and a back surface 30b indicated in FIG. 3. It has a main body 31 and to side wings 31a, 31b extending across the main body 231 in the transversal direction Y.

The side wings 31a, 31b of the moving carriage 30 both have a drive slot 32, 33.

In an embodiment of the invention, a portion 32c, 33c at least of the drive slots 32, 33 is inclined with respect to the vertical direction Z.

In an embodiment, the portion 32c, 33c of the drive slots 32, 33 may for example be outwardly inclined, being further from a shaft 7 at its upper end than at its lower end.

The drive slots 32, 33 may be straight, rounded or presenting angles.

The drive slots 32, 33 possess, at least in their inclined portion 32a, 33c, an inner flank 32a, 33a located on the side of the main body 31 of the moving carriage 30 and in outer flank 32b, 33b located on the opposite side of the drive slot.

The jaws 24, 25 further comprise slugs 24c, 25c fitting in the drive slots 32, 33 of the moving carriage 30.

The slugs 24c, 25c are for example cylindrical studs visible in FIG. 4, extending frontwards in the longitudinal direction X, and come to penetrate the drive slots 32, 33 of the moving carriage 30 through the back face 30b of said carriage 30.

Due to the inclination of the drive slots 32, 33 with respect to the vertical axis Z, the movement of the moving carriage 30 in the vertical direction Z drives the support of the slugs 24c, 25c against the inner or outer flanks of the drive slots 32, 33 as illustrated in FIGS. 7a and 7b.

More precisely, when the moving carriage 30 moves from the blocking position to the unblocking position, the outer flanks 32b, 33b of the drive slots 32, 33 come to exert a force against the slugs 24c, 25c repelling them outwards as a result. The jaws 24, 25 then rotate outwards to engage with the shafts 7.

Hence, when the moving carriage 30 is in its unblocking position, it applies a force to the jaws 24, 25 to place them in contact with the shafts 1, this force being transmitted to the shafts through the jaws 24, 25.

In an embodiment of the invention, the inner flanks 32a, 33a of the drive slots 32, 33 may be flexible to absorb part of the force exerted by the moving carriage 30 on the jaws 24, 25. Openings 35, 36 may for example be performed in the side wings 31a, 31b, on the inner side of the drive slots 32, 33, to reduce the thickness of the material forming the inner flanks 32a, 33a. In this way, when the inner flanks 32a, 33a engage with the studs 24c, 25c, said flanks may elastically bend inwards, in the openings 35, 36, and absorb part of the force exerted by the moving carriage 30 on the jaws 24, 25.

A return spring 40, consisting of a metallic wire rolled around a rivet 40 a performed in the housing 20, is fixed to its first end 40 b to the housing 20 and to its second end 40 c to the moving carriage 30. The spring 40 is rolled so that it applies a force on the moving carriage 30, for example an upwardly directed force, in order to bring the carriage 30 back in its unblocking position and to stress the jaws 24, 25 in their immobilization positions.

A traction wire 50 may penetrate the housing 20 through an opening 21 e performed in its lower surface 21 b and be linked to the moving carriage 30 at one of its ends 51 so that it is possible to control it from the unblocking position to the blocking position, to release the jaws 24, 25. A notch 37 may for example be performed in the moving carriage 30 to accommodate the end 51 of the traction wire 50.

The other end of the wire may be accessible from various locations of the vehicle and from the seat so as to allow the retraction of the headrest 5 from a distance by the vehicle driver or by a user handling the seat.

Alternatively, a motor or an electromagnet may be connected to the moving carriage 10 and/or replace the spring 40 for allowing to move said moving carriage Advantageously, the use of a single spring, without active devices, makes it possible to control the movement of the moving carriage through a manual control (i.e. a cable and a spring), which simplifies in particular the mounting system.

Figure 8:
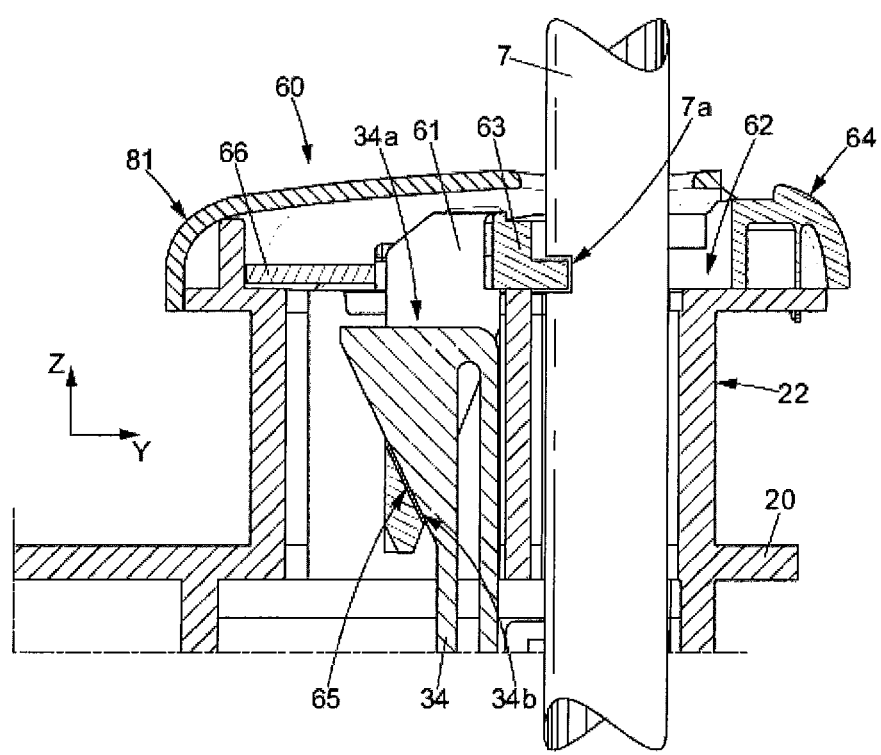
FIG. 8 is a partial cross-sectional representation in the referenced VIII-VIII orientation in FIG. 2 when the lock is in immobilization position.

With reference being made to FIG. 8, a lock 60 is placed at the upper end 22b of a sleeve 22. The lock 60 consists of a latch 61 having an opening 62, through which the shaft 7 extends, and a shoulder 63 placed on the inner side of said opening 62.

The lock 60 may be moved in the transversal direction Y from an unlocking position in which there is a clearance between the lock 60 and the shaft 7, to a locking position in which the shoulder 63 is in contact with the shaft 7 and may engage, in some vertical positions of the shaft 7, with notches 7a performed in the inner face of said shaft 7. A spring 66 applying an outwardly oriented force in the transversal direction Y makes it possible to stress the lock 60 in the locking position.

In an advantageous way, the lock 60 may be manually activated by the user at one of its ends 64 accessible from the outside.

The lock 60 may further comprise a control surface inclined inwards with respect to the vertical direction Z, i.e. further away from the inside at its lower end than at its upper end. The moving carriage 30 will then be able to have an upper arm 34 extending vertically inside the sleeve 22 from the main body 31 to an upper end 34a having an inclined surface 34b adapted to engage with the inclined control surface 65.

A portion of the inclined surface 34 b of the arm 34 is located above and outside the inclined control surface 65. In this way, when the moving carriage 30 moves from the unblocking position to the blocking position, the inclined surface 34 b of the arm 34 may engage with the inclined control surface 65 to move the lock 60 from its locking position to its unlocking position.

Finally, the sleeves 22, 23 each have at their end a flange 80, 81, arranged on the upper end of the backrest 3 of the seat and allowing to hide the upper end 22b, 23b of the sleeves 22, 23 from the user's sight.

The invention claimed is:

1. A vehicle seat including:
a base,
a backrest mounted on the base,
a headrest mounted on top of the backrest, the backrest comprising at least one shaft extending in a vertical direction into the backrest,
a housing fixed in the backrest and enclosing the shaft with a radial clearance,
a moving carriage movably mounted on the housing between a blocking position and an unblocking position, the moving carriage comprises at least one drive slot,
at least one jaw movably mounted on the housing between an immobilization position and a release position, wherein the jaw is supported on and rotates relative to the housing between the immobilization position and the release position via a flexible hinge, the jaw being adapted to apply, when it is in the immobilization position, a clamping force to the shaft in a clamping direction perpendicular to the vertical direction so that the shaft is supported in the housing, and the jaw enabling the shaft to slide vertically in the housing when the jaw is in the release position, the jaw having a slug which is slidably mounted in the drive slot of the moving carriage such that the slug is engaged by the drive slot causing the jaw to be in the immobilization position when the moving carriage is in the unblocking position and to be in the release position when the moving carriage is in the blocking position, and
a lock which is movably mounted with regard to the housing between a locking position wherein the lock immobilizes the shaft in the vertical direction and an unlocking position wherein the lock enables the shaft to move in the vertical direction, the lock and the jaw cooperating with the shaft at different heights, and the lock being controlled by the moving carriage so that the lock is in the locking position when the moving carriage is in unblocking position, and the lock is in the unlocking position when the moving carriage is in blocking position.

2. The vehicle seat according to claim 1, wherein the moving carriage is movably mounted in the vertical direction between the blocking position and the unblocking position, and wherein at least one inclined portion of the drive slot is substantially inclined with respect to the vertical direction and engages the slug to drive the jaw to be in the immobilization position when the moving carriage is in the unblocking position.

3. The vehicle seat according to claim 1, wherein the jaw includes a flexible clamping member adapted to be in contact with the shaft and to apply the clamping force on said shaft, when the jaw is in the immobilization position.

4. The vehicle seat according to claim 3, wherein the jaw includes at least one opening behind the flexible clamping member in order to allow the clamping member to flex by a predetermined value when it applies the clamping force.

5. The vehicle seat according to claim 1, further comprising a return spring adapted to apply a force on the moving carriage in order to bring the carriage back into the unblocking position.

6. The vehicle seat according to claim 1, wherein the jaw and the housing form a unitary assembly.

* * * * *